US009272828B2

(12) United States Patent
Shirrell et al.

(10) Patent No.: US 9,272,828 B2
(45) Date of Patent: *Mar. 1, 2016

(54) CONDENSATION CONTROL FILM

(71) Applicant: Signode Industrial Group LLC, Glenview, IL (US)

(72) Inventors: Jack N. Shirrell, Greensburg, KY (US); Tun-Jen Chu, Plainfield, IL (US); Deepak H. Mehta, Naperville, IL (US); Owen J. McGarel, Naperville, IL (US); Michael F. Hansen, Miami Beach, FL (US)

(73) Assignee: Signode Industrial Group LLC, Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,376

(22) Filed: Dec. 29, 2014

(65) Prior Publication Data

US 2015/0118423 A1    Apr. 30, 2015

Related U.S. Application Data

(63) Continuation of application No. 13/013,632, filed on Jan. 25, 2011, now Pat. No. 8,936,152.

(60) Provisional application No. 61/385,008, filed on Sep. 21, 2010.

(51) Int. Cl.
*B65D 85/84* (2006.01)
*B65D 71/00* (2006.01)
(Continued)

(52) U.S. Cl.
CPC . *B65D 65/40* (2013.01); *B32B 1/08* (2013.01); *B32B 27/08* (2013.01); *B32B 27/306* (2013.01); *B32B 27/32* (2013.01); *B65D 65/22* (2013.01); *B65D 71/0096* (2013.01); *B32B 2250/02* (2013.01); *B32B 2250/03* (2013.01); *B32B 2264/102* (2013.01); *B32B 2264/105* (2013.01); *B32B 2264/108* (2013.01); *B32B 2307/304* (2013.01); *B32B 2307/31* (2013.01); *B32B 2307/40* (2013.01); *B32B 2307/412* (2013.01); *B32B 2307/70* (2013.01); *B32B 2323/046* (2013.01); *B32B 2331/04* (2013.01); *B32B 2553/00* (2013.01); *B65D 2571/0003* (2013.01);
(Continued)

(58) Field of Classification Search
CPC combination set(s) only.
See application file for complete search history.

(56) References Cited

U.S. PATENT DOCUMENTS 3,542,713 A   11/1970   Kessler et al.
3,930,790 A    1/1976   Rogosch (Continued)

FOREIGN PATENT DOCUMENTS

EP    0705687 A1   4/1996
EP    0770658 A2   5/1997
(Continued)

OTHER PUBLICATIONS

International Search Report and the Written Opinion in connection with PCT/US2011/025389 dated May 25, 2011.

(Continued)

*Primary Examiner* — Jacob K Ackun
(74) *Attorney, Agent, or Firm* — Levenfeld Pearlstein, LLC

(57) ABSTRACT

A film that can be used in packaging applications includes one or more layers, wherein the layers include an anti-fog additive and/or an IR additive and the resulting film has greater than about a 50% prestretch capability.

11 Claims, 4 Drawing Sheets

(51) Int. Cl.
*B65D 65/40* (2006.01)
*B32B 27/32* (2006.01)
*B32B 27/30* (2006.01)
*B32B 1/08* (2006.01)
*B32B 27/08* (2006.01)
*B65D 65/22* (2006.01)

(52) U.S. Cl.
CPC ...... *Y10T 428/1334* (2015.01); *Y10T 428/1338* (2015.01); *Y10T 428/1341* (2015.01); *Y10T 428/1345* (2015.01); *Y10T 428/256* (2015.01); *Y10T 428/2817* (2015.01); *Y10T 428/2826* (2015.01); *Y10T 428/3154* (2015.04); *Y10T 428/31938* (2015.04)

(56) References Cited

U.S. PATENT DOCUMENTS

| | | |
|---|---|---|
| 4,082,877 A | 4/1978 | Shadle |
| 4,686,791 A | 8/1987 | Miyata |
| 4,799,745 A | 1/1989 | Meyer et al. |
| 5,027,946 A * | 7/1991 | Parsons .................. 206/323 |
| 5,256,473 A | 10/1993 | Kotani et al. |
| 5,563,182 A | 10/1996 | Epstein et al. |
| 5,948,708 A | 9/1999 | Langley |
| 6,046,254 A | 4/2000 | Kneale |
| 6,049,419 A | 4/2000 | Wheatley et al. |
| 6,200,680 B1 | 3/2001 | Takeda et al. |
| 6,517,936 B1 | 2/2003 | Ciocca et al. |
| 7,297,384 B2 | 11/2007 | Crowley |
| 2004/0234797 A1 | 11/2004 | Schwark et al. |
| 2006/0105126 A1 | 5/2006 | Kendig |
| 2007/0134505 A1 | 6/2007 | Hutt |
| 2007/0248803 A1 | 10/2007 | Kleisch et al. |
| 2008/0038571 A1 | 2/2008 | Kilitzmiller et al. |
| 2008/0187708 A1 | 8/2008 | Decker et al. |
| 2008/0213573 A1* | 9/2008 | Leplatois .................. 428/332 |
| 2009/0258191 A1 | 10/2009 | Peacock |
| 2009/0323180 A1 | 12/2009 | Weber et al. |
| 2010/0215933 A1 | 8/2010 | Fiscus et al. |
| 2011/0065867 A1 | 3/2011 | Keung et al. |
| 2011/0073003 A1 | 3/2011 | Gemici et al. |

FOREIGN PATENT DOCUMENTS

| | | |
|---|---|---|
| JP | 2000081510 | 3/2000 |
| WO | 2008006199 A1 | 1/2008 |
| WO | 2008104370 A2 | 9/2008 |
| WO | 2010049300 A1 | 5/2010 |

OTHER PUBLICATIONS

Foldes, F., & Szigeti-Erdei, A. (1997). Migration of Additives in Polymers. Journal of Vinyl & Additive Technology, 3 (3). 220-224.

Irusta, L., Gonzalez, A., Fernandez-Berridi, J., Iruin, J. J., Asua, J. M., Albizu, I., Ibarzabel, A., Salmeron, A., Espi, E., Fontecha, A., Garcia, Y., & Real, A.I. (2008). Migration of Antifog Additives in Agricultural Films of Low-Density Polyethylene and Ethylene-Vinyl Acetate Copolymers. Journal of Applied Polymer Science, 111, 2299-2307. doi:10.1002/app.29280.

Wylin, F. (2009). Antifogging Additives. In H. Zweifel, R.D. Maier, & M. Schiller (Eds.), Plastics Additives Handbook (pp. 637-651). Cincinnati: Hanser Publications.

* cited by examiner

CONDENSATION CONTROL FILM

CROSS-REFERENCE TO RELATED APPLICATION DATA

This application claims the benefit of priority of Provisional U.S. Patent Application Ser. No. 61/385,008, filed Sep. 21, 2010.

BACKGROUND OF THE DISCLOSURE

The present invention relates generally to a film for use in packaging applications and, more particularly, to such a film that has condensation control characteristics.

The most common way to wrap pallets is the use of a film, such as a stretch film, which is wrapped around a pallet to provide stability to a pallet load and some degree of product protection. To increase protection, a top sheet or a loose plastic bag is sometimes added to the pallet prior to being wrapped by the stretch film. However, this arrangement does not always provide a sufficient barrier to moisture, dust, and other debris. Another common way to wrap pallets is the use of a shrink hood, which is generally in the form of a bag placed over a pallet, which is then exposed to heat, to shrink the hood tight around the pallet. However, the shrink hood method requires equipment and energy to generate heat.

In recent years, an alternate method to wrap pallets known as a "stretch hood" system has been gaining in popularity. The stretch hood system utilizes a gusseted bag that is stretched and placed over the pallet. Stretch hood films result in a package that provides several advantages, e.g., a stretch hooded pallet provides five sided protection to the pallet that is essentially water and dust proof, especially as compared to a stretch film wrapped pallet. In addition, the stretch hood film provides more holding force to the pallet and greatly helps with load stability.

Stretch hood films provide excellent protection for the contents from environmental elements. However, like other plastic films, stretch hood films are subject to moisture condensation inside the hood. Generally, when a pallet wrapped with a plastic film is exposed to sunlight, the temperature inside the hood will rise, very much like a green-house effect. Moisture inside the packaged materials, for example in paperboard boxes, is evaporated by the heat. If the outside temperature is subsequently reduced, as typically occurs at night, the film temperature can be reduced below the dew point and moisture in the air will condense, typically as tiny droplets on the inside film surface. These tiny droplets can coalesce together into larger ones and run down the film. The amount of water is sometimes significant enough to cause damage to the contents and is a potential environment for mold growth. Produce packaging companies are especially concerned about this phenomenon. The condensation phenomena occurs quite often in the morning when the inside temperature is raised by sunlight, but the temperature outside and film temperature are still low.

Various approaches have been attempted to address the problem of condensation on the film surface. In one example, holes or perforations are mechanically punched into the film to vent moisture. Though it is widely used in certain grocery applications, perforations have only limited effectiveness for stretch hood applications because while the perforations allow moisture to leave the pallet, they also allow moisture and dust to enter, thereby eliminating any net benefit.

In another example, microporous films are used that consist of a high concentration of mineral fillers, such as calcium carbonate, that are stretched to create micropores. However, microporous films, such as films used in diapers and hygiene products, lack stretch capacity and transparency that are preferred in stretch hood applications.

Opaque bag films have also been used and are effective in blocking out sunlight and hence moisture condensation. However, opaque films are not preferred due to the lack of transparency, which prevents visual inspection of the contents and reading, for example, of a barcode on the object disposed inside the film. It is also generally known to include pigment additives to packaging films for aesthetic purposes, e.g., to prevent discoloration when the film is stretched, and to improve mechanical properties, such as tear resistance, of the film.

Alternatively, the goods are sometimes covered by a large bag that is strapped over, leaving the bottom loose. However, such a loose bag approach does not provide much protection against rain or dust and, depending on the strapping, moisture can still be trapped inside the bag in certain areas.

Accordingly, there is a need for a film that can be used in packaging applications, such as a stretch film, top sheet, loose bag, and/or stretch hood, that overcomes one or more of the above-noted deficiencies in existing packaging films.

SUMMARY OF THE DISCLOSURE

According to one example, a film that can be used in packaging applications includes one or more layers, wherein the layers include an anti-fog additive and/or an infrared ("IR") blocking and/or absorbing, or reflecting additive and the resulting film has greater than about a 50% prestretch capability. The film may further include a first or inner layer, a second or core layer, and a third or outer layer, wherein the anti-fog additive may be incorporated into the first layer and the IR additive may be incorporated into any layer, such as the third layer. In addition, the anti-fog additive may also be incorporated into the second layer. Examples of the anti-fog additive include a sorbitan ester, glycerol ester, fatty acid ester, polyglycerol ester, polyfluroethylene, or combinations of two or more thereof. Examples of the IR additive include one of, or combinations of, carbon black, titanium oxide white, silver metal flake, phthalocyanine, and cobalt aluminate spinel. Still further, the one or more layers may be vapor and liquid impermeable and may primarily include metallocene linear low-density polyethylene.

According to another example, a film that can be used in a packaging application includes one or more layers. The layers include at least one of an anti-fog additive and an IR additive and are arranged in a tube-like form with one or more side gussets, which may be provided in roll form. In addition, the film may include a first or inner layer, a second or core layer, and a third or outer layer. The anti-fog additive may be incorporated into the first layer and the IR additive may be incorporated into any layer, such as the third layer. Further, the anti-fog additive can also be incorporated into the second layer. Examples of the anti-fog additive include a sorbitan ester, glycerol ester, fatty acid ester, polyglycerol ester, polyfluroethylene, or combinations of two or more thereof. Examples of the IR additive include one of, or combinations of, carbon black, titanium oxide white, silver metal flake, phthalocyanine, and cobalt aluminate spinel. Still further, the one or more layers, that is the film, may have a total or overall thickness of about 1.5 to 8.0 thousandths of an inch (mils) and preferably about 2.7 to about 5.5 mils and the tube-like form may have a circumference of about 50 to about 450 inches, and preferably about 100 to about 250 inches.

According to yet another example, a stretch hood packaged load includes a load of goods and a stretch hood disposed around the load. The stretch hood includes a film having one or more layers and the layers include at least one of an anti-fog additive and an IR additive. The stretch hood may include an anti-fog additive and/or an IR additive. Further, the film may include a first inner or layer, a second or core layer, and a third or outer layer, wherein the anti-fog additive may be incorporated into the first layer and the IR additive may be incorporated into any layer, such as the third layer. In addition, the anti-fog additive may also be incorporated into the second layer. Examples of the anti-fog additive include a sorbitan ester, glycerol ester, fatty acid ester, polyglycerol ester, polyfluroethylene, or combinations of two or more thereof. Examples of the IR additive include one of, or combinations of, carbon black, titanium oxide white, silver metal flake, phthalocyanine, and cobalt aluminate spinel. Still further, the stretch hood may include a heat seal formed by, for example, a seal bar at a temperature of about 300 to about 325 degrees Fahrenheit and a seal time of about 0.1 to about 3 seconds, and preferably about 1.5 to about 2.6 seconds.

BRIEF DESCRIPTION OF THE DRAWINGS

Other aspects and advantages of the present disclosure will become apparent upon reading the following detailed description and upon reference to the drawings in which.

DETAILED DESCRIPTION

Figure 1:
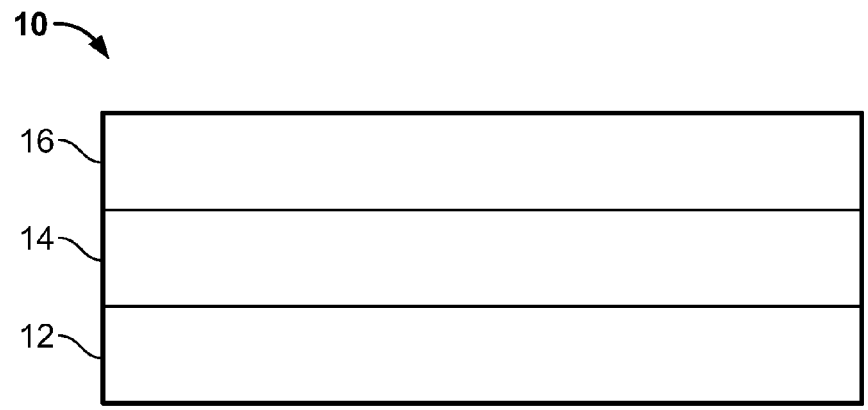
FIG. 1 illustrates a diagrammatic cross-sectional view of a film according to one example.

While the present disclosure is susceptible of implementation in various forms, there is shown in the drawings and will hereinafter be described one or more examples with the understanding that the present disclosure is not intended to limit the disclosure to the specific examples illustrated and discussed.

Typical films used for stretch hood packaging applications are non-porous, vapor and liquid impermeable films that may be constructed of a stretchable polymer with a greater than about a 50% prestretch capability, such as metallocene linear low-density polyethylene ("mLLDPE"), an ethylene vinyl acetate copolymer ("EVA"), and/or an ethylene-propylene copolymer. Generally, the prestretch capability is defined as a percentage of the films initial circumference (length in the transverse direction) that the film can be stretched without failing or tearing during application. The film may optionally include slip agents, anti-blocking agents, anti-static additives, and/or other common additives, as would be apparent to one of ordinary skill in the art. The film may include a single layer or multiple layers formed by any known process, such as extrusion, coextrusion, blown film co-extrusion, lamination, and the like. Following is a non-limiting list of physical properties of stretch hood packaging films that are contemplated for use in the present disclosure:

| PROPERTY | VALUE | ASTM METHOD |
|---|---|---|
| Percent Prestretch Capability | 65 | — |
| Elmendorf Tear Machine Direction (MD) | 1050 g-force | D-1922 |
| Elmendorf Tear Transverse Direction (TD) | 1700 g-force | " |
| Coefficient of Friction, kinetic | 0.45 | D-1894 |
| Haze | 16% | D-1003 |
| Tensile Properties | — | D-882 |
| 1% Secant Modulus (MD) | 19,000 | " |
| 1% Secant Modulus (TD) | 20,000 | " |
| Tensile @ Yield (MD) | NYP* | " |
| Tensile @ Yield (TD) | 1600 psi | " |
| Elongation @ Yield (MD) | NYP* | " |
| Elongation @ Yield (TD) | 50% | " |
| Ultimate Tensile (MD) | 5100 psi | " |
| Ultimate Tensile (TD) | 5000 psi | " |
| Elongation @ Break (MD) | 650% | " |
| Elongation @ Break (TD) | 700% | " |

*NYP = No Yield Point

In one non-limiting example, the film includes multiple layers formed by a blown film co-extrusion process. More particularly and referring to FIG. 1, a film 10 includes a first or inner layer 12, a second or core layer 14, and a third or outer layer 16. According to one example, the inner and outer layers 12, 16 are composed of mLLDPE with slip and anti-block agents and the core layer 14 is a softer resin, such as EVA or an ethylene-propylene copolymer. While a multi-layer film is illustrated in FIG. 1, single layer formulations are also contemplated and may include a higher percentage vinyl acetate than multi-layer films.

To prevent moisture from condensing on the film 10, functional condensation control additives may be included in some or all of the layers 12, 14, 16. In one example, the inner layer 12 includes anti-fog additives that change the surface energy of the film 10 and prevent moisture from forming droplets on the film 12. Due to the migratory nature of some anti-fog additives, additional anti-fog additives may optionally be included in the core layer 14 and/or the outer layer 16 so that the anti-fog characteristic of the inner layer 12 is not depleted prematurely. The addition of anti-fog additives in the core layer 14 also helps to ensure the continuous presence of anti-fog after the film 10 is stretched and thinned. Following is a non-limiting list of potential anti-fog agents:

| Manufacturer | Name | Chemical Structure | Form |
|---|---|---|---|
| Croda | Atmer 103 | Sorbitan Ester | Powder |
| Croda | Atmer 185 | Glycerol Ester | Powder |
| Polyfil | AFC-1001 | Proprietary/Fatty Acid Ester | Masterbatch |
| Ampacet | 102163-U | Proprietary | Masterbatch |
| Polyvel | S-2050 | Proprietary | Masterbatch |
| Danisco | Grindsted PGE O 80 | Polyglycerol Ester | Paste |
| Daiken | Unidyne TG 1001 | Proprietary/Polyfluoroethylene | Powder |

Other examples of anti-fog agents that may be incorporated include, without limitation, glycerol fatty acid ester, polyglycerol fatty acid ester, polyethylene glycol fatty acid ester, glycol fatty acid ester, polyethylene glycol alkyl ether, ethoxylated alkyl phenol, sorbitan ester, ethoxylated sorbitan ester, and alkanol.

To further prevent moisture from condensing on the film 10, one or more of the layers, such as the outer layer 16, can also contain other condensation control additives, such as IR additives or certain colorants to block and/or absorb infrared light, e.g., from sunlight. The IR additives may reduce heat buildup inside the film by reducing sunlight penetration and/ or increase the film surface temperature by absorbing light, thereby preventing moisture condensation on the warm surface. Carbon black is a common IR absorber. Metallic flakes are also effective in reducing heat inside the film partially due to light reflection. Alternatively or in conjunction, IR additives may be added to the inner layer 12 and/or the core layer 14. Following is non-limiting list of potential IR additives:

| Manufacturer | Name | Chemical Structure | Form |
|---|---|---|---|
| Shepherd | Yellow 10P110 | Ni, Sb, Ti Rutile | Masterbatch |
| Standridge | | Carbon black | Masterbatch |
| Standridge | | TiO2 white | Masterbatch |
| Clariant | Pearl Silver | Metallic flakes | Masterbatch |
| Fujifilm | Projet 900NP | Phthalocyanine | Powder |
| Shepherd | Blue 385 | Co aluminate Spinel | Masterbatch |
| Unimin | HC1400, DTF900 | SiO2 + Al2O3 + Na2O | Powder |
| Heubach | Heucodur IR series | Complex Inorganics | |
| Ferro GmbH | Cool and Eclipse series | Complex metal oxides | |
| Nanophase | Nano ATO | Nano Sb2O3 | |
| Ampacet | 12083 | Silver/Metallic flakes | Masterbatch |

Moisture condensation may be reduced by adding only an anti-fog additive or an IR additive. However, the combination of an anti-fog additive and an IR additive has been shown to provide the most significant reduction in condensation, while maintaining other desirable characteristics, such as transparency and film strength. Table 1 below lists film formulations with no additives, with only an anti-fog additive, and with anti-fog and different IR additives. The film formulations of Table 1 were used in stretch hoods disposed over palletized goods, e.g., paperboard boxes, and exposed outdoors. After two weeks, moisture condensation for each of the film formulations was rated from 5 being dry to 1 being wet. A significant improvement can be seen from combinations of anti-fog/tinted black and anti-fog/tinted silver-metallic flakes. Further, and importantly, the film formulations of Table 1 were sufficiently transparent to allow a barcode on the goods, within the stretch hood, to be read.

TABLE 1

CONDENSATION RATINGS OF CERAIN FILM FORMUALTIONS

| Film Type | Condensation rating (1 = wet, 5 = dry) |
|---|---|
| Control (no additives) | 1 |
| AFC - 1001 18% | 4 |
| AFC - 1001 18% + Black 1% | 4.5 |
| AFC - 1001 18% + Silver 4% | 4 |

In one embodiment, the film formulations of Table 1 include additives from the following list:

AFC-1001 available from Polyfil Corp. of Rockaway, N.J.;

carbon black concentrate from Standridge Color Corp. of Social Circle, Ga.; and pearl silver concentrate from Clariant International Ltd. Of Muttenz, Switzerland.

The AFC-1001 may be added to about 5-30 weight % of the weight of the film layer to which the additive is added, the carbon black may be added to about 0.01-5 weight %, and the pearl silver may be added to about 1-10 weight %. In another example, the AFC-1001 may be added to about 10-25 weight %, the carbon black may be added to about 0.1-2 weight %, and the pearl silver may be added to about 2-6 weight %. In yet another example, the AFC-1001 may be added to about 18 weight %, the carbon black may be added to about 1 weight %, and the pearl silver may be added to about 4 weight %. However, in other embodiments, different additives and proportions may be used, as would be apparent to one of ordinary skill in the art. All of the weight percentages are based upon the weight percent (%) of the additive in the film layer to which the additive is added.

In another example, a laboratory test was developed to evaluate condensation characteristics of various film formulations, such as the formulations described above. More particularly, an environmental chamber was set up at a temperature of 8° C. and 50% relative humidity and a row of high intensity lights, e.g., Sylvania Tungsten Halogen Capsylite bulbs, were established above palletized goods with stretch hoods disposed thereon. In one example, the light intensity from the lights was about 40,000 Lux (about 60 W/m2 or about 35% of outdoor sunlight intensity). The nominal moisture content of the goods was about 8.3%. For purposes of reference only and intended without limitation, an appearance or moisture rating during the laboratory test was periodically assigned to the films based upon the criteria listed below in Table 2.

TABLE 2

VISUAL MOISTURE RATINGS

1—An opaque layer of small fog droplets. Very poor performance. Zero visibility and poor light transmission
2—An opaque or transparent layer of large droplets. Poor performance. Zero visibility and poor light transmission
3—A complete layer of large transparent droplets. Poor performance. Poor visibility, lens effect, and dripping.
4—Some drops randomly scattered. Acceptable performance. Discontinuous film of water.
5—A transparent film displaying no visible water. Excellent performance. Completely transparent.

Figure 2:
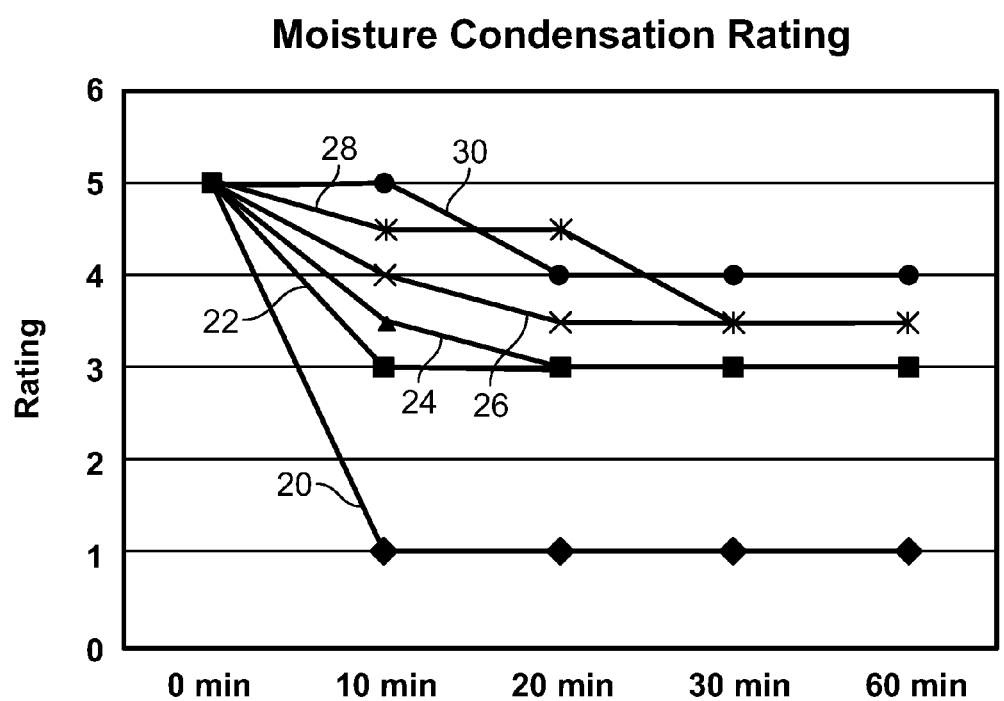
FIG. 2 is a chart that shows appearance or moisture ratings of various film formulations over time during a laboratory test according to an example.

Periodic appearance ratings for film formulations with no additives, with different percentages of only an anti-fog additive, and with anti-fog and different IR additives are illustrated in FIG. 2. More particularly, in FIG. 2 a first line 20 represents a control film without any anti-fog or IR additive. A second line 22 represents a film with only an anti-fog additive at a first weight % of the weight of the film layer to which the additive is added, such as AFC-1001 at about 18 weight %. A third line 24 represents a film with an anti-fog additive, such as AFC-1001 at about 18 weight %, and a black IR additive, such as carbon black concentrate at about 0.5 weight % of the weight of the film layer to which the additive is added. A fourth line 26 represents a film with an anti-fog additive, such as AFC-1001 at about 18 weight %, and a silver IR additive, such as silver concentrate at about 4 weight % of the weight of the film layer to which the additive is added. A fifth line 28 represents a film with an anti-fog additive, such as AFC-1001 at about 18 weight %, a black IR additive, such as carbon black concentrate at about 0.5 weight %, and a silver IR additive, such as silver concentrate at about 4 weight %. A sixth line 30 represents a film with only an anti-fog additive at a second weight % greater than the first weight %, such as AFC-1001 at about 24 weight % of the film layer to which the additive is added. The proportion of anti-fog and IR additives may be varied and modified, as discussed above. From FIG. 2 it is observed that a significant reduction is achieved in the amount of moisture present between the control film 20 and the films 22-30 that contain condensation control additives.

Higher levels of anti-fog additives alone may provide acceptable condensation reductions, for example, as seen in FIG. 2 between the films represented by lines 22 and 30. However, such higher levels of anti-fog additives may also affect sealability and transparency characteristics of the film. Depending, in part, upon the application of the film, an approach combining anti-fog additives with other additives, such as IR absorbers, may reduce the level of anti-fog additives needed while providing good sealability and transparency characteristics.

Additional tests were conducted using a control film (no additives) and films that included an 18% by weight anti-fog additive and various concentrations of carbon black concentrate and silver metallic concentrate. Condensation ratings (as indicated in Table 2) were made for the various films for outdoor conditions (for a period of 2 months) and for accelerated environmental chamber test cup conditions (for a period of 3 weeks). Barcode readability was also noted for the various test samples. It should be noted that about 5% anti-fog (by weight) was added to the core layer in addition to the 18% (by weight) anti-fog concentration in the inner layer in Samples 2-9. The results are shown in Table 3, below.

TABLE 3

CONDENSATION RATINGS FOR VARIOUS FILMS

| Sample No. | Anti-fog Conc. (% wt.) | Black Conc. (% wt.) | Silver Metallic Concentrate (% wt.) | Barcode Readable (Y/N) | Outdoor Cond. Rating (1-5) | Accel. Env. Chamber Cup Rating (1-5) |
|---|---|---|---|---|---|---|
| 1 | 0 | 0 | 0 | Y | 1.5 | 1 |
| 2 | 18 | 0.5 | 1.5 | Y | 5 | na |
| 3 | 18 | 0.5 | 2.0 | N | 5 | na |
| 4 | 18 | 1.0 | 1.5 | Y | 5 | 5 |
| 5 | 18 | 1.0 | 2.0 | N | 5 | na |
| 6 | 18 | 1.5 | 1.5 | N | 5 | na |
| 7 | 18 | 1.5 | 1 | Y | 5 | 5 |
| 8 | 18 | 1 | 1 | Y | 5 | na |
| 9 | 18 | 1.25 | 1.25 | Y | 5 | 5 |

As can be seen from the results in Table 3, films without the anti-fog and black and silver metallic concentrate (the control, Sample 1) did not provide much if any protection from condensation within the wrapped load. With 18% anti-fog additive, and 0.5% to 1.5% black concentrate and 1.0% to 2.0% silver metallic concentrate, acceptable levels of condensation retardation were observed. Barcode readability somewhat declined with combined black and silver metallic concentrated levels over about 1.5% and 1.5% respectively. It should be noted that barcode readability is not an imperative in that not all loads require such readability. In TABLE 3, above, Samples 2, 3, 5, 6 and 8 were not subjected to accelerated environmental chamber cup rating.

The films that were tested had an overall thickness of about 4 mils (4/1000 inch), with the inner and outer layers each comprising about 20% of the overall thickness (about 0.8 mils each) and the core layer comprising about 60% of the overall thickness (2.4 mils). In the tested films, the anti-fog additive was included in the inner layer and the black and silver metallic additives were included in the outer layer. Otherwise, the control and other films (Samples 2-9) were identical. It should also be noted that although referred to as silver metallic, the additive is not a silver or silver compound. Rather it is a metallic flake additive, typically an aluminum-based additive.

The surface temperature of a film having anti-fog and black and silver additives was compared to a non-additive (control) film. The temperatures of the film were measured in October, in northern Illinois on a day with considerable sunshine. The surface temperature of the control film was measured at about 40.1° C. (about 104.2° F.) and the temperature of the anti-fog and black and silver additive containing film was measured at about 44.8° C. (about 112.6° F.).

Without being held to or limited by theory, it is believed that the present film provides enhanced condensation control for a number of reasons. First, the anti-fog additive facilitates the distribution or spreading of whatever moisture may be present on the film over a greater area of the film. This prevents the pooling or collection of larger quantities of condensation on the film. The black concentrate or pigment allows the film to heat up which changes the dynamics of moisture build up and condensation. Moisture tends to condense on colder surfaces and the increased temperature of the black-containing film thus tends to reduce condensation on the film. In addition, the silver metallic additive tends to block some of the ultraviolet (UV) energy (sunlight) and reflect some of the IR energy from entering the package (film enclosed load) and thus tends to keep the load at a lower temperature.

Figure 5:
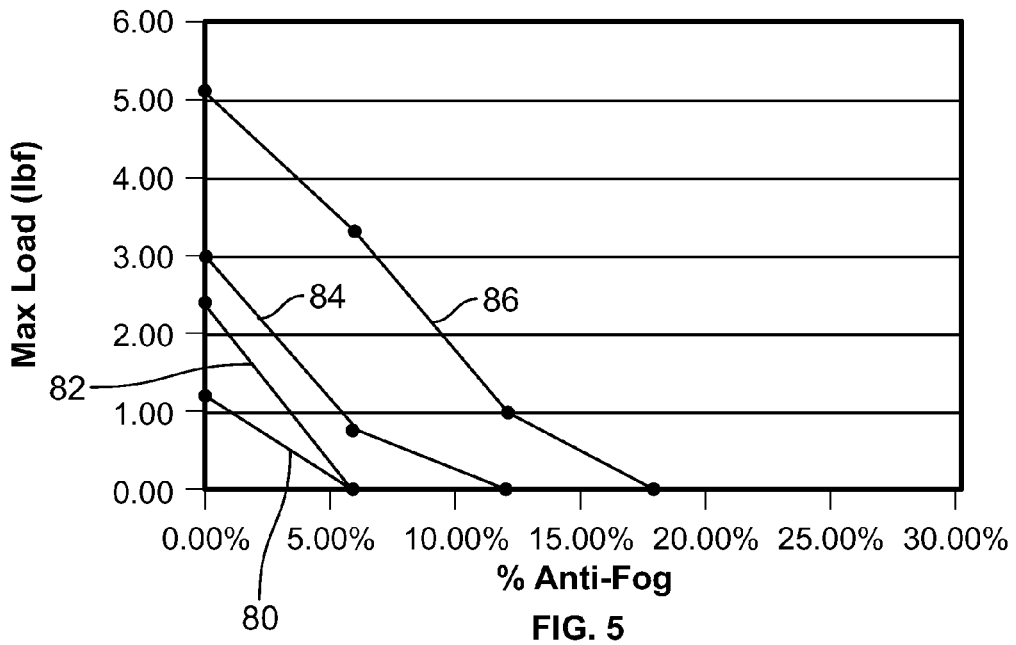
FIGS. 5-7 are charts that show seal strength data with different seal temperatures, seal times, and condensation control additive percentages.
Figure 6:
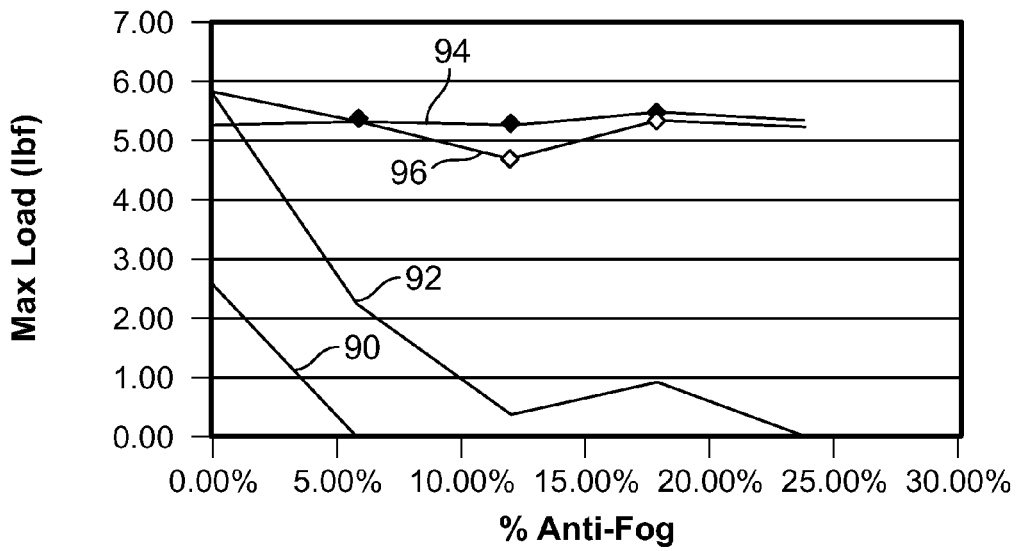
Figure 7:
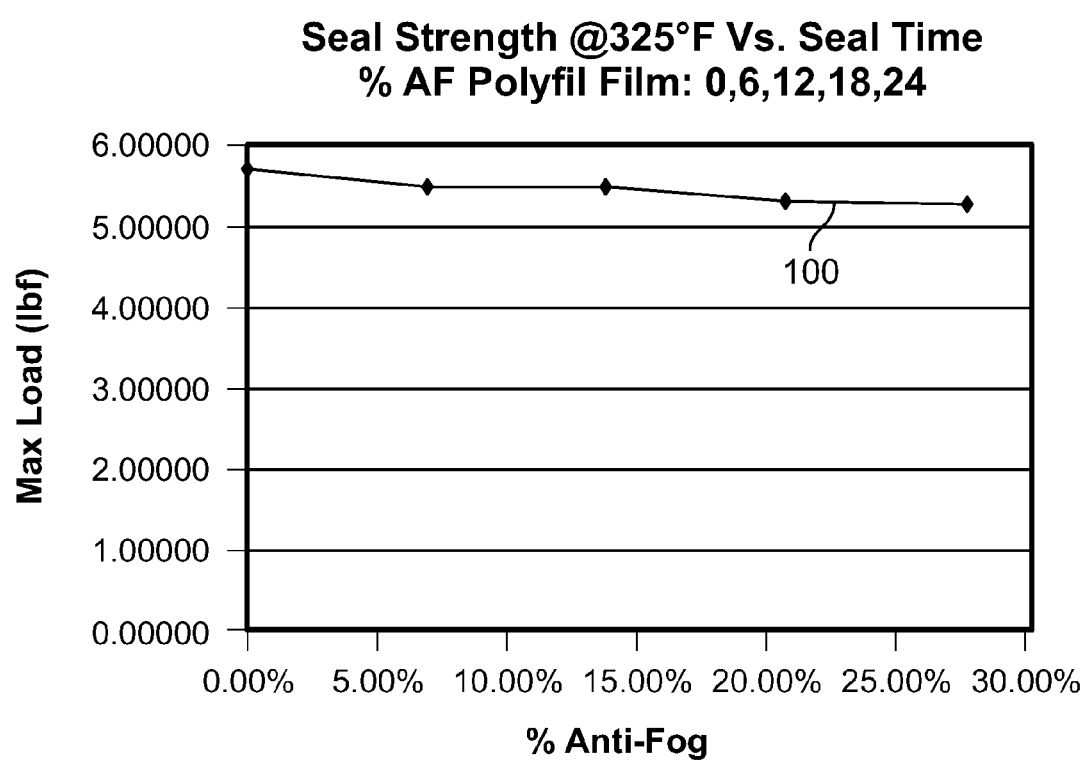

In addition, sealability issues may be overcome by adjusting the sealing temperature (seal bar temperature) and/or sealing time. More particularly, it has been found that increasing the temperature of seal bars and increasing the seal time may result in improved seal strength with greater percentages of condensation control additives. For example, FIG. 5 illustrates seal strength in relation to weight % of anti-fog additive with a seal bar temperature of about 280 degrees Fahrenheit (about 138 degrees Celsius) and a seal time of about 1.8 seconds (line 80), 2.1 seconds (line 82), 2.4 seconds (line 84), and 2.6 seconds (line 86). FIG. 6 illustrates seal strength in relation to weight % of anti-fog additive with a seal bar temperature of about 300 degrees Fahrenheit (about 149 degrees Celsius) and a seal time of about 1.5 seconds (line 90), 1.8 seconds (line 92), 2.1 seconds (line 94), and 2.6 seconds (line 96). FIG. 7 illustrates seal strength in relation to weight % of anti-fog additive with a seal bar temperature of about 325 degrees Fahrenheit (about 163 degrees Celsius) and a seal time of about 1.5 seconds (line 100). It can be seen from FIGS. 5-7 that a film layer including up to about 24 weight % of anti-fog additive has an enhanced seal strength with a seal bar temperature of about 300 degrees Fahrenheit (about 149 degrees Celsius) and a seal time of about 2.1-2.6 seconds. Seal strength is further improved with a seal bar temperature of about 325 degrees Fahrenheit (about 163 degrees Celsius) and a seal time of about 1.5 seconds. Seal times from about 0.1 second to about 3.0 seconds are contemplated.

Figure 4:
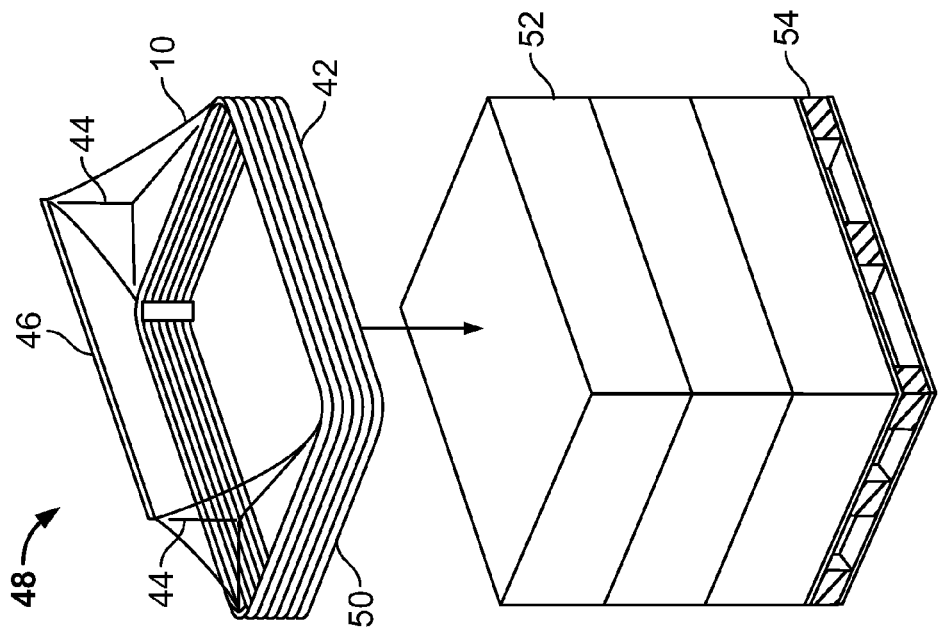
FIG. 4 illustrates a diagrammatic isometric view of a stretch hood as it is expanded to be placed over a load.
Figure 3:
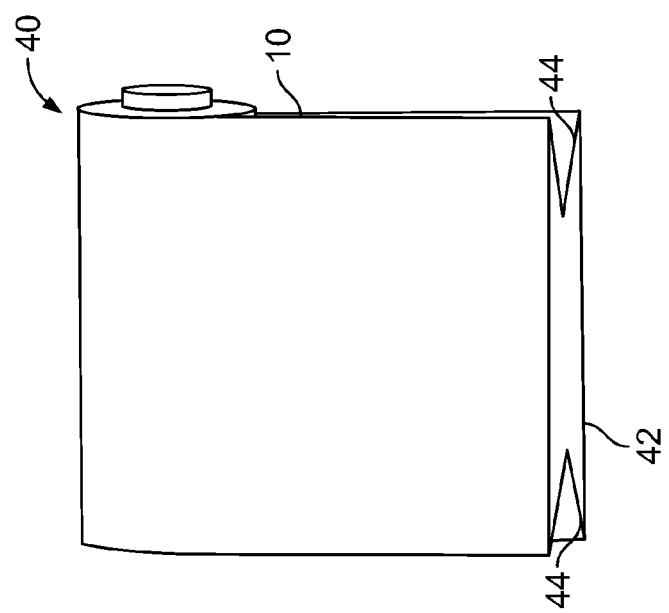
FIG. 3 illustrates a diagrammatic isometric view of a roll of stretch hood film according to another example.

Referring now to FIGS. 3 and 4, a roll 40 of film 10 is shown that can be utilized in packaging applications. More particularly, the film 10 is arranged in a tube-like form 42 and can include one or more side gussets or folds 44 as illustrated in the exemplary tube-like form 42. The tube 42, as such, defines a continuous peripheral wall. In one non-limiting example, the film 10 is about 2.7-5.5 mils in total or overall thickness and the tube-like form 42 has a circumference of about 100-250 inches (about 254-635 cm). The roll 40 of FIG. 3 may be suitable for use with stretch hood equipment, wherein a length of film 10 is measured and sealed at one end, such as by a heat seal 46, and cut to form a stretch hood 48 with an open bottom end 50. The stretch hood 48 may then be stretched, pulled over goods 52 to be packaged, and released to securely package the goods, as would be apparent to one of ordinary skill in the art. The goods 52 may optionally be disposed on a pallet 54 and the stretch hood may be disposed over only the goods or the goods and the pallet.

The film compositions described herein can be used in a wide variety of applications to reduce moisture condensation. One such application includes use as a packaging material, wherein the film compositions provide various benefits, including, without limitation, reducing moisture condensation and subsequent damage to packaged goods, eliminating mold growth concerns, providing a film composition that is compatible with existing packaging equipment in general and stretch hood equipment in particular, matching mechanical properties of existing packaging films, being sufficiently transparent to allow contents, labels, barcodes, etc. to be seen therethrough, providing a non-porous, leak-proof, and stable structure that provides excellent protection from environmental elements, and being cost competitive with other known films. The film 10 can, of course, be used in automatic as well as manual packaging operations.

Other embodiments include all of the various combinations of individual features of each of the embodiments described herein.

What is claimed is:

1. A film that can be used in packaging applications, comprising:
    at least three layers including a first layer, a second layer and a third layer, the first layer having an anti-fog additive present in a concentration of between about 5% and 24% by weight of the layer, the anti-fog additive being a sorbitan ester, glycerol ester, fatty acid ester, polyglycerol ester, polyfluroethylene, or combinations of two or more thereof, a different one of the layers including an IR additive,
    wherein the film is sufficiently transparent to allow labels or barcodes to be seen or read therethrough when the film is applied to a load, wherein the resulting film has greater than about a 50% prestretch capability, and wherein the film, when sealed to itself at a seal bar temperature of 300 degrees F. applied for 2.6 seconds, has a seal strength of at least 4 lbs and when sealed to itself at a seal bar temperature of 300 degrees F. for 2.1 seconds, has a seal strength of at least about 5 lbs.

2. The film of claim 1, wherein at least one of the at least three layers is vapor and liquid impermeable.

3. The film of claim 1, wherein the first layer is mLLDPE.

4. The film of claim 1 wherein the third layer is EVA, ethylene-propylene copolymer or a combination thereof.

5. The film of claim 1, wherein the IR additive is one of, or combinations of, carbon black, titanium oxide white, silver metal flake, phthalocyanine, and cobalt aluminate spinel.

6. The film of claim 1, wherein the first layer is an inner layer and the third layer is an outer layer and wherein the anti-fog additive is present in the first layer and the IR additive is present in the third layer.

7. The film of claim 1 wherein the third layer is mLLDPE.

8. The film of claim 6 wherein one or both of the inner and outer layers are sealed to one another along a seal line to form a tube.

9. The film of claim 1 wherein the three layers have a total thickness of about 1.5 to about 8.05 mils and the tube has a circumference of about 100 to about 250 inches.

10. The film of claim 8 wherein the seal line is a first seal line and including a second seal line transverse to the first seal line.

11. The film of claim 6 wherein the second layer includes the anti-fog additive.

* * * * *

UNITED STATES PATENT AND TRADEMARK OFFICE
CERTIFICATE OF CORRECTION

PATENT NO. : 9,272,828 B2
APPLICATION NO. : 14/584376
DATED : March 1, 2016
INVENTOR(S) : Jack N. Shirrell et al.

Page 1 of 1

It is certified that error appears in the above-identified patent and that said Letters Patent is hereby corrected as shown below:

In the Specification:

Column 2, line 38, "polyfluroethylene," to read as --polyfluoroethylene,--.

Column 2, lines 56-57, "polyfluroethylene," to read as --polyfluoroethylene,--.

Column 3, line 12, "polyfluroethylene," to read as --polyfluoroethylene,--.

Column 5, line 44 approx., "FORMUALTIONS" to read as --FORMULATIONS--.

In the Claims:

Column 10, line 3, Claim 1, "polyfluroethylene," to read as --polyfluoroethylene,--.

Signed and Sealed this
Nineteenth Day of July, 2016

Michelle K. Lee
*Director of the United States Patent and Trademark Office*